(12) United States Patent
van Geloven et al.

(10) Patent No.: US 8,754,360 B2
(45) Date of Patent: Jun. 17, 2014

(54) SYSTEM AND METHOD OF DETECTING MOVEMENT OF AN OBJECT

(75) Inventors: Johannes Anthonie Josephus van Geloven, Eindhoven (NL); Bernardus Martinus Johannes Kup, Eindhoven (NL)

(73) Assignee: NXP, B.V., Eindhoven (NL)

( * ) Notice: Subject to any disclaimer, the term of this patent is extended or adjusted under 35 U.S.C. 154(b) by 506 days.

(21) Appl. No.: 13/120,876

(22) PCT Filed: Sep. 26, 2009

(86) PCT No.: PCT/IB2009/054220
§ 371 (c)(1),
(2), (4) Date: Mar. 25, 2011

(87) PCT Pub. No.: WO2010/035239
PCT Pub. Date: Apr. 1, 2010

(65) Prior Publication Data
US 2011/0170119 A1 Jul. 14, 2011

(30) Foreign Application Priority Data
Sep. 26, 2008 (EP) .................................... 08165313

(51) Int. Cl.
*G06M 7/00* (2006.01)
(52) U.S. Cl.
USPC ....................................... 250/221; 250/222.1
(58) Field of Classification Search
USPC .......... 250/201.1, 203.1, 203.2, 203.4, 203.7, 250/221, 222.1; 340/555–557
See application file for complete search history.

(56) References Cited

U.S. PATENT DOCUMENTS

| 5,943,233 A | 8/1999 | Ebina et al. |
| 5,990,578 A | 11/1999 | Krauss |

(Continued)

FOREIGN PATENT DOCUMENTS

| DE | 228 132 A1 | 10/1985 |
| EP | 0 847 138 A2 | 6/1998 |

(Continued)

OTHER PUBLICATIONS

International Search Report and Written Opinion for Int'l. Patent Application No. PCT/IB2009/054220 (Dec. 30, 2009).

*Primary Examiner* — Francis M Legasse, Jr.

(57) ABSTRACT

The present invention relates to a detection system for detecting movements of a movable object (6). The system comprises: a light source (S) being adapted for emitting light, a reflecting unit (8) being arranged in a functional connection with said movable object and being adapted for reflecting said emitted light, an analogue-to-digital converter being adapted for outputting a digital signal and including at least one detector (D1 to D4; PE1, PE2) for detecting said reflected light and outputting detection signals for determining the movement of said movable object, current sources being adapted for outputting current signals, and at least one capacitor being adapted for receiving said detection signals and said current signals, a common mode controller being adapted for sensing a voltage on said at least one capacitor and for generating at least one common mode signal for controlling said current sources depending on the sensed voltage, wherein said digital signal indicative of said movement of said movable object being based on said output signal of said at least one detector and said at least one common mode signal. The present invention further refers to a joystick using the detection system, as well as to a method of detecting movements of the movable object.

15 Claims, 8 Drawing Sheets

(56) References Cited

U.S. PATENT DOCUMENTS

| | | | |
|---|---|---|---|
| 6,504,404 B2 * | 1/2003 | Uchiki et al. | 327/65 |
| 8,022,728 B2 * | 9/2011 | Kanda et al. | 326/83 |
| 2007/0040108 A1 * | 2/2007 | Wenstrand | 250/221 |
| 2009/0101804 A1 * | 4/2009 | Phan Le | 250/221 |

FOREIGN PATENT DOCUMENTS

| | | |
|---|---|---|
| WO | 2007/122539 A2 | 11/2007 |
| WO | 2007/122556 A2 | 11/2007 |

* cited by examiner

SYSTEM AND METHOD OF DETECTING MOVEMENT OF AN OBJECT

FIELD OF THE INVENTION

The present invention refers to a detection system, and in particular to a detection system for detecting the movements of a movable object on the basis of an analogue-to-digital converter, to a joystick using the detection system, and method of detecting movements of the movable object.

BACKGROUND OF THE INVENTION

In the recently growing market for mobile devices, such as mobile phones, PDAs, the diversity in functionalities has increased so that in most existing mobile devices a display is provided having a cursor which can be controlled by the user usually by means of a joystick which may contain, for example, five switches arranged in conjunction with a knob to be operated by the user for obtaining the movement of the cursor on the display. The respective switches are closed depending upon the movement of the knob of the joystick to the left or right side or for obtaining the "click" function by moving (depressing) the joystick vertically, when a menu on the display has been reached and the cursor for selecting a predetermined item is actually positioned.

For easy operation of the mobile devices a continuous and highly sensitive and reliable control of the cursor by means of the joystick is required, and the joystick must be compact, robust and must have a high performance in conjunction with a low price.

In this connection, reference WO 2007/122556 A2 discloses a detection circuit for detecting the movements of a movable object, such as a joystick, wherein a plurality of first detection units is provided for detecting the presence or absence of a light spot on the detection units, the light spot being influenced in its position by the movement of the movable object according to the user's intention (the operation by the user). Second detection units are provided for detecting light intensities of the light spot depending upon a movement of the movable object in a further direction. Specifically, two intensities of the light spot are detected by the second detection units, and a corresponding output signal is obtained indicative of the movement of the movable object in a Z direction (vertical movement, representing the click function of the joystick). The output signals of the detection units are compared with corresponding reference signals, and the result is obtained as a one bit digital signal. The signals are digitalized at every photodetector of the detection units to obtain the digitalized signal ready for further data evaluation. The detection units comprise photodiodes and transistors for digitizing the signals from the photodiodes.

SUMMARY OF THE INVENTION

It is an object of the present invention to provide a detection system for detecting movements of a movable object, wherein the detection result of the movement of the movable object is provided as a digital signal based on a simplified circuit arrangement, a joystick using the same as well as a corresponding method of detecting movements of a movable object.

According to the present invention, this object is accomplished by a detection system for detecting movements of a movable object, a joystick and a method of detecting movements of a movable object according to the appended claims.

According to a first aspect of the present invention the detection system for detecting movements of a movable object may comprise: a light source being adapted for emitting light, a reflecting unit being arranged in a functional connection with the movable object and being adapted for reflecting the emitted light, an analogue-to-digital converter being adapted for outputting a digital signal and including at least one detector for detecting the reflected light and outputting detection signals for determining the movement of the movable object, current sources being adapted for outputting current signals, and at least one capacitor being adapted for receiving the detection signals and the current signals, a common mode controller being adapted for sensing a voltage on the at least one capacitor and for generating at least one common mode signal for controlling the current sources depending on the sensed voltage, wherein the digital signal indicative of the movement of the movable object being based on the output signal of the at least one detector and the at least one common mode signal.

According to the present invention, a precise detection of movements of the movable object in a X and Y plane and a Z direction perpendicular to the X and Y plane can reliably be detected while the complexity of the detection circuitry can be kept low. The detection system may be implemented in the form of a joystick. The detection system therefore supports the X and Y detection which corresponds to an angle measurement of the joystick, as well as the click detection which corresponds to the vertical movement in the Z direction. The detection functions are completely coupled to the analogue-to-digital converter ADC to obtain, from the measurement or detection signals, a precise digital detection signal which can be subject to any further data evaluation.

It is to be noted that the exact current through the detectors (that is, the photosensitive diodes of the detectors functioning as sensing elements) does not need to be known. An increase in the current in the circuitry due to an increased light intensity (irradiance) on the detectors or a corresponding increase or decrease of the respective light intensity in conjunction with a click and release function performed by the user is reliably detected and is converted into a digital value representing the detected movement of the movable object. The circuit arrangement according to the present invention, therefore, provides an easy way of detecting the movement in the X and Y plane as well as the click and release function in conjunction with the movable object with a simplified circuitry, and moreover the circuitry can be integrated together with further electronic components of the detection system preferably on one chip.

Preferred embodiments of the present invention are defined in the appended claims.

Moreover, the at least one capacitor may be charged by the current from the current sources and the at least one detector. The at least one detector, the light source, the common mode controller and the analogue-to-digital converter may be arranged on a substrate, and the reflecting unit may be adapted for causing a light spot to be incident on the substrate.

The at least one common mode signal may be adapted for setting the current flowing in the current sources. The analogue-to-digital converter may include two capacitors connectable to the current sources via switches. The analogue-to-digital converter may further include a comparator, and voltages on the two capacitors are fed to input terminals of the comparator.

The comparator may be adapted for comparing the voltages on the two capacitors, and for outputting the digital signal as the comparison result, the digital signal being fed to the switches for controlling an open or closed state thereof.

The common mode controller may be adapted for sensing a medium voltage on both capacitors and for comparing the sensing result with a predetermined reference voltage, and the common mode controller may generate the at least one common mode signal for increasing the current through all current sources, if the sensed medium voltage is below a predetermined threshold value, and may generate the at least one common mode signal for decreasing the current through all current sources, if the sensed medium voltage is above the predetermined threshold value.

The detection system may comprise a system clock generator for generating at least one system clock, and wherein the comparator may be a clocked comparator using the clock pulses of the system clock.

The common mode controller may further comprise a voltage amplifier, one terminal thereof being supplied with the sensed medium voltage and another terminal being supplied with a predetermined reference voltage including the predetermined threshold value.

The system may further comprise a system clock generator being adapted for generating at least one system clock, and the digital signal being based on clock pulses of the system clock and being fed to a counter for counting the pulses over a predetermined number of cycles, the counted number of pulses corresponding to differences in the current flowing through the detectors due to the movement of the movable object.

The light spot caused by the reflecting unit may include a predetermined irradiance profile of reflected light, and the determination of the movement of the movable object in predetermined direction may be based on an increase in the irradiance profile of the light spot on the at least one detector due to the movement.

The present invention according to a second aspect also refers to a joystick for a movable device, further including the detection system according to the first aspect of the invention.

According to a third aspect the present invention refers to a method of detecting movements of a movable object. The method comprises the steps of: emitting light to a reflecting unit (Step S1), reflecting the emitted light by the reflecting unit being arranged in a functional connection with the movable object (Step S2), detecting the reflected light by at least one detector and outputting detection signals for determining the movement of the movable object (Step S3), receiving by at least one capacitor the detection signals and current signals output by current sources (Step S4), sensing a voltage on the at least one capacitor, generating at least one common mode signal and controlling the current sources with the at least one common mode signal depending on the sensed voltage (Step S5), and outputting a digital signal indicative of the movement of the movable object based on the detection signal and the at least one common mode signal (Step S6). The method exhibits the same advantages as mentioned in conjunction with the detection system according to the first aspect of the invention.

The present invention is further elucidated by the following figures and examples, which are not intended to limit the scope of the present invention. The person skilled in the art will understand that various embodiments may be combined, lying within the scope of the present invention.

BRIEF DESCRIPTION OF THE DRAWINGS

The above object, advantages and features together with numerous other advantages and features will be apparent from the embodiments of the present invention described hereinafter.

In the following drawings.

DETAILED DESCRIPTION OF THE DRAWINGS

Figure 1:
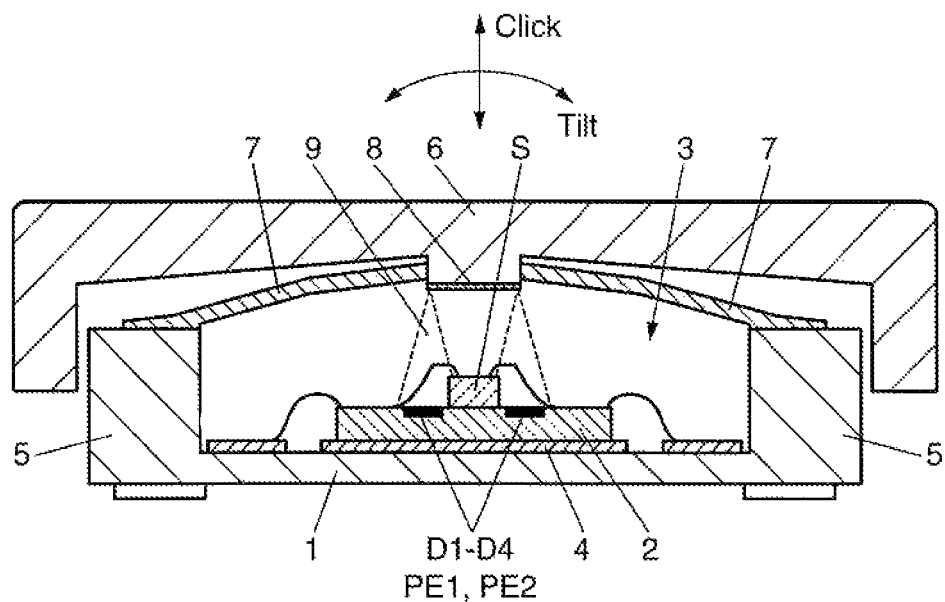
FIG. 1 shows a cross-sectional view of the arrangement of the detection system of the present invention.

FIG. 1 shows an overall configuration of the detection system 10 according to the present invention in the form of a cross-sectional view.

According to the examples and embodiments described in this specification the detection system 10 according to the present invention can be implemented as a joystick of any apparatus or mobile device. In the following description it is also referred to a joystick, which may be provided specifically in the form of an optical joystick as such or which may be part of any other pointing device for controlling a cursor on a display of the portable device.

As is shown in FIG. 1, the cross-sectional view shows a package 1, wherein on a substrate 2 which is arranged in a cavity 3 of the package 1a plurality of detectors (such as photosensitive elements or light receiving elements) D1 to D4 is provided. The plurality of detectors D1 to D4 which have a light sensing function and of which due to the cross-sectional view only detectors D3 and D4 are shown, is arranged on the substrate 2 or implemented (embedded) therein. The substrate 2 is fixed to the package 1 preferably in the central portion thereof in the cavity 3 by means of a metal layer 4.

A light source S which consists of a light emitting element or plural light emitting elements (light emitting means, array) is provided adjacent to the plurality of detectors D1 to D4 and preferably but necessarily at the central portion of the substrate 2. According to FIG. 1 the plurality of detectors D1 to D4 is arranged around the light source S, preferably according to a predetermined pattern and/or symmetry. Necessary electrical connections may be provided by bonding wires and/or corresponding connection means.

The substrate 2 in conjunction with the plurality of detectors D1 to D4, the light source S and the corresponding connections may be commonly housed inside the package 1 and may be surrounded by sidewalls 5 on both sides of the package 1. The package 1 may be provided in the form of a IC package, and may include the detection system 10 according to the present invention.

In the vertical direction in FIG. 1 above the light source S a touch surface is arranged and provided according to a preferred embodiment in the form of a knob 6 which constitutes a general movable object, and, thus, the touchable part of the detection system 10 for operation by the user.

According to FIG. 1 the knob 6 (that is, the movable object) forms a cover over the package 1 and the cavity 3 thereof, and may be movable to a certain extent in the three possible spatial directions relative to the package 1. The knob 6 is movably (elastically) supported by a flexible suspension mechanism which is preferably provided by means of at least one spring 7 which allows the knob 6 to be tilted a few degrees around a virtual point when a user's finger intends to operate the detection system 10 and applies a force to the knob 6. Different moving angles and positions of the knob 6 can be obtained, and the knob 6 will return to its rest position (the upright position as shown in FIG. 1) when the force of the user's finger is removed.

At a lower surface or lower portion of the knob 6 opposite to and facing the cavity 3 of the package 1 a reflecting unit 8 is provided for reflecting at least part of the light emitted by the light source S in the direction to the detectors D1 to D4. Mounted basically at the central portion of the knob 6 preferably at a protruding portion extending in a downward direction in FIG. 1 towards the substrate 2 and in particular to the light source S, the reflecting unit 8 can be provided as a mirror or any reflecting surface, for example, by applying a metalized layer or film to this predetermined portion of the knob 6. The spring 7 may be arranged for fixing the knob 6 at a predetermined position which corresponds to the rest position (position without any movement to the left or right side, the position shown in FIG. 1), and the movement of the knob 6 is limited by the sidewalls 5 of the package 1 to which also according to the preferred embodiment the spring 7 is fixed. That is, the at least one spring 7 biases the knob 6 to its rest position which is the upright position as shown in FIG. 1.

Figure 2:
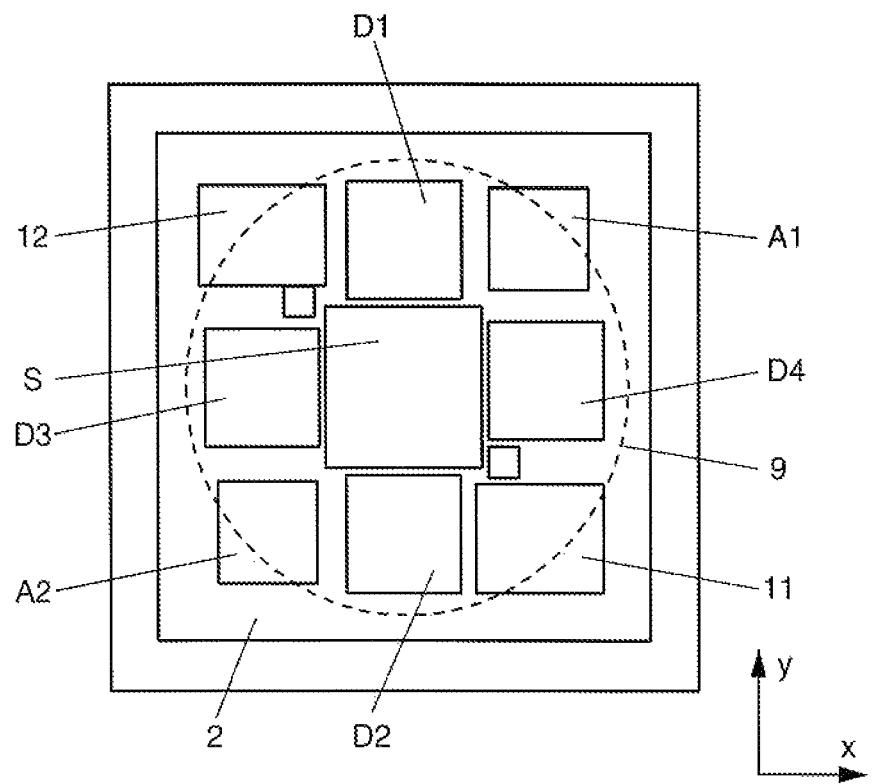
FIG. 2 shows a floor plan of the detection system according to the present invention.

The shape of the knob 6 which may be made of an elastic material or a rigid material, as well as of the package 1 and the spring 7 is represented in FIG. 2 just as an explanatory example, and these components may be provided or designed or dimensioned in a different manner without departing from the principles and the performance of the present invention.

The knob 6 with its flexible support by the at least one spring 7 stands in the upright (rest) position wherein the reflecting unit 8 is basically parallel to the upper surface of the substrate 2, and the reflecting unit 8 is opposite to the light source S so that emitted light of the light source S is reflected by the reflecting unit 8 towards the plurality of detectors D1 to D4 arranged on the substrate 2.

FIG. 2 shows a floor plan of the detection system 10 according to the present invention and specifically represents a top view on the substrate 2 of the package 1 of FIG. 1.

As can be seen from FIG. 2, the reflecting unit 8 causes by reflecting light of the light source S a light spot 9 on the substrate 2. When the knob 6 preferably carrying the reflecting unit 8 is flexibly moved by the operation of the user, the light intensity of the reflected light on the plurality of detectors D1 to D4 is varied. Movement detection is performed by evaluating the variation in the light intensity on the detectors D1 to D4.

As can be seen from FIG. 2, the detectors D1 to D4 are arranged preferably around the light source S and fully lie within the light spot 9. It is also possible that the plurality of detectors may only partly be located within the light spot 9. The plural detectors D1 to D4 may be provided in the form of a plurality of light sensitive elements, such as, for example, photodetectors, and the particular photodetectors of each detector D1 to D4 may be arranged according to a predetermined pattern or array within the area of each detector D1 to D4. The light source S, which may be composed of a light emitting means, such as a light emitting diode, may emit light of a specific intensity and wavelength (color). In case of plural light emitting diodes each may emit a light portion for forming the complete light emission intensity (irradiance) which is directed upward in FIG. 1 and reflected downward in FIG. 1 to the detectors.

The light spot 9 is shown in FIG. 2 in the form of a dashed circle, but this is only an example of the shape of the light spot 9, and the present invention is not limited to such a shape and area of the light spot 9 which may also have a different shape such as a square or a rectangular shape depending upon the shape of the light source S and the shape of the reflecting unit 8.

On the substrate 2 according to FIG. 2 further areas are allocated to further digital circuit areas, such as the areas 11 and 12 which may be used to implement further general digital circuitry. The digital circuitry may be provided for data processing and control and may also include an internal system clock generator as well as corresponding interface portions.

Moreover, the substrate 2 of the detection system according to the present invention and as shown in FIG. 2 includes further predetermined areas, such as areas A1 and A2 which are allocated to analogue-to-digital converters ADC the arrangement and structure of which will be described hereinafter in conjunction with the further functions of the detection system 10 of the present invention.

Regarding the arrangement shown in FIG. 2 and more specifically the areas allocated to particular functional elements, it is to be noted that this arrangement is not limited to the square outline of the light source S and of the plural detectors D1 to D4, but different shapes of the light source S or the detectors D1 to D4 may be provided within the usual design options. This holds for any block or section arranged on the substrate 2 and as shown in FIG. 2. While the light spot 9 is shown in FIG. 2 has a circular area, other shapes are possible without degrading the performance of the present invention.

In the areas of the plural detectors D1 to D4 the photosensitive components thereof may be evenly distributed in the dedicated area or may be arranged according to a predetermined pattern which may further be dependent on the technology used and further design conditions. Also variations in this respect do not influence the performance of the present invention.

The knob 6 which represents the movable object may have different positions in addition to the rest position shown in FIG. 1. In case the knob 6 is operated by the user, i.e. is touched by the user on its upper surface and tilted to a tilt angle $\alpha \neq 0$, this causes, by preferably basically maintaining or only slightly varying the size and the position of the light spot 9 on the substrate 2, variations in the light intensity specifically on the plural detectors D1 to D4. That is, when the user moves the knob 6 to a further tilting angle different from the tilting angle $\alpha = 0$ (rest position), light intensity variations occur on the plural detectors D1 to D4, and, for example, a movement in a particular direction, such as the X direction causes a modification of the light intensity distribution on particular detectors, such as detectors D3 and D4, whereas a movement of the knob 6 (and of the reflecting unit 8) in the Y direction (perpendicular to the X direction) causes the utilizable intensity variation on the particular detectors D1 and D2.

Accordingly, since the symmetry of the incident light on the plurality of detectors D1 to D4 is broken due to the tilted knob 6 which may be tilted in any possible direction (causing the reflecting unit 8 to be tilted in the same manner), in case of any movement of the knob 6 in the X-direction and to the right hand side in FIG. 2, the fourth detector D4 receives more light than the third detector D3 while the first and second detectors D1 and D2 still basically receive an equal amount of light. Other movements change the light intensity (that is, the amount of light incident on particular detectors D1 to D4 due to the reflecting function of the reflecting unit 8) in a similar and respective manner.

After data evaluation of the output signals of the detectors D1 to D4, for example, in comparison with suitable threshold values for previously detected output values of the detectors D1 to D4, a precise information about the movement of the knob 6 operated by the user can be obtained. The output signals after data evaluation are used for controlling the position of a cursor on any corresponding display to be controlled.

In FIG. 1, in the upper portion thereof, arrows are shown to indicate the possibility of operating the knob 6 by the user. That is, the arc-shaped arrow with the inscription "tilt" indicates the examples of the tilt angle α.

The vertical arrow shown in FIG. 1 with the inscription "click" indicates the detection in the Z axis perpendicular to the X and Y plane, and this will be described in greater detail hereinafter.

Figure 3:
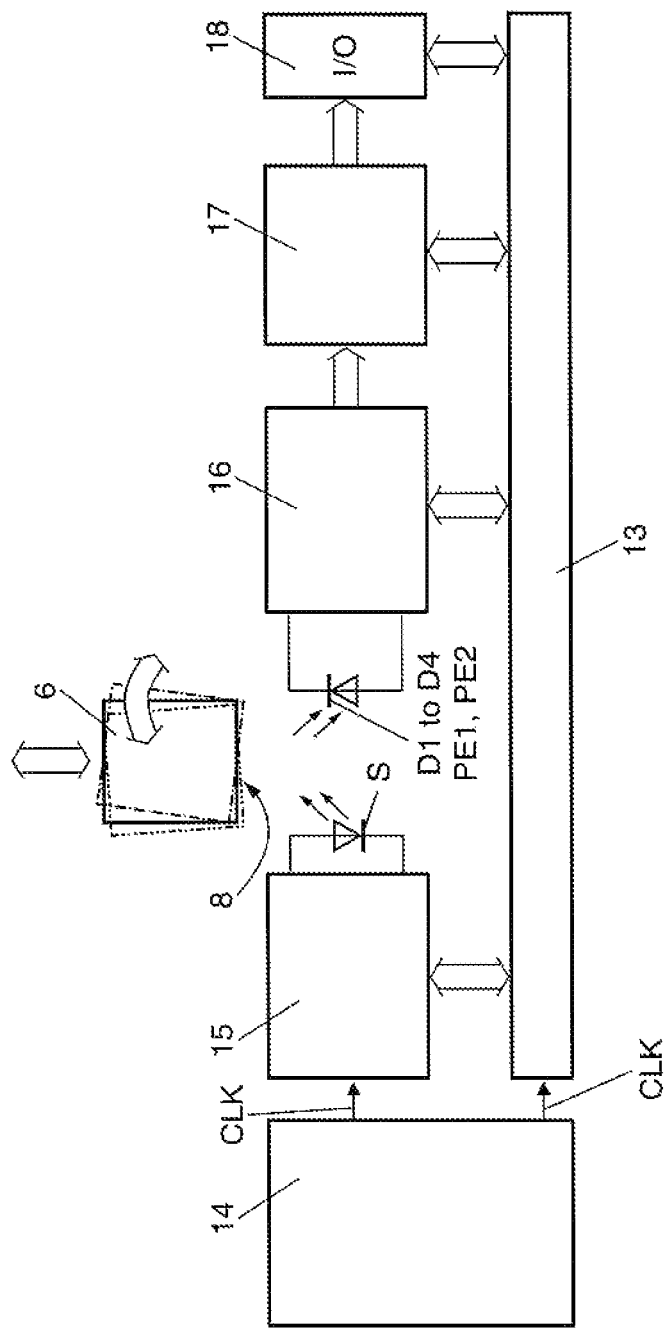
FIG. 3 shows a block circuit of the detection system representing an overview of the data processing components according to the present invention and the function thereof.

FIG. 3 shows a block circuit arrangement in conjunction with mechanical components according to the detection system of the present invention.

As is shown in FIG. 3, the light source S is represented for simplification by a light emitting diode LED which emits light directed to the lower portion (lower surface) of the knob 6 to which the light reflecting unit 8 is detached. Light from the light source S is reflected by the reflecting unit 8 and is irradiated on the detectors D1 to D4 which are represented in FIG. 3 by a single photosensitive element, such as, for example, a photodiode.

The circuit arrangement shown in FIG. 3 depicts a central controller (a central data evaluation and control means) 13 for performing the overall control of the detection system and for further controlling the specific data evaluation. The controller 13 receives information from the other components of the detection system and provides, after the corresponding and predetermined data evaluation (preferably performed according to predetermined programs) the necessary control of the detection system.

In particular, the controller 13 is connected to a system clock unit 14 adapted for providing the detection system with the necessary system clocks CLK. This corresponds to the previously mentioned internal system clock generator.

The controller 13 (and also the clock unit 14) is connected to a light source controller 15 which is adapted for controlling the light source S, and specifically the at least one light emitting diode thereof, thereby providing a power control of the light source S, that is, a control of the emitted light intensity (amount of light) and/or of the color components of the light (frequency, wavelength). The possibilities of control may depend on the particular light emitting elements used in the light source S and may further depend on the sensitivity of the photosensitive elements of the plurality of detectors D1 to D4.

Moreover, as shown in FIG. 3, the detectors D1 to D4 are connected to a click detector 16 wherein a first preprocessing of the output signals of the detectors D1 to D4 is performed. In this connection, the click detector 16 comprises an analogue-to-digital conversion function (A/D converter) ADC used in conjunction with the click detection, that is, for the evaluation of the output signals of the detectors D1 to D4. Use of the click detector and the corresponding detection principles, which are in detail described hereinafter, may also be used for the detection of any movements of the knob 6 (movable object) in the X and Y directions.

The detection result of the click detector 16 is fed to a data processor 17 which is adapted for providing the further data processing, that is, for providing a data evaluation of the output signals of the click detector 16 to obtain an information about the desired cursor movement and/or position. The click detection concept according to the present invention performed in the click detector 16 and the corresponding data processing in the data processor 17 provide a correlation between the movement of the knob 6 caused by an operation of the user (tilt angle α and click operation), and the desired movement or position of the cursor on a respective display.

The information obtained by the data processor 16 which represents the entire detection result, can be fed, by means of a further interface unit (I/O), to the outside of the detection system 10 of the present invention. The outside of the detection system corresponds to any further device or apparatus including the display which is to be controlled to which the detection system 10 is connected or in which the detection system 10 is arranged.

In conjunction with FIG. 3 showing a schematic arrangement, one light sensitive element, such as a photodiode, is represented as the detectors D1 to D4. It is in this connection to be noted that the click detection, that is, the detection of a movement of the knob 6 in the Z direction can be performed based on the output signals of all the light sensitive elements of each of the plurality of the detectors D1 to D4.

According to a preferred embodiment of the present invention, particular (selected) photosensitive elements of one or plural or each of the detectors D1 to D4 can be allocated to the click detector 16 specifically for obtaining the click detection (Z detection). It is also further possible to provide in addition to the photosensitive elements of the plurality of detectors D1 to D4, at least one or preferably a predetermined number of additional photosensitive elements (not shown) which mainly serve for click detection, these additional photosensitive elements being then connected to the click detector 16 for obtaining the necessary data evaluation of their output signals (representing detection or sensing signals).

The additional photosensitive elements may be arranged on the substrate 2 and preferably on the one hand adjacent to the plurality of detectors D1 to D4, and on the other hand close to the position of light source S. The invention is, however, not limited to such an arrangement, and the additional photosensitive elements which are to be used for the click detection can be arranged at any position on the substrate 2 provided that these photosensitive elements fully lie within the light spot 9 caused by the reflected light from the light source S by means of the reflecting unit 8, irrespective of whether the knob 6 is moved to any small tilt angle or any maximum value thereof by an operation of the user.

In the following it is referred to particular photosensitive elements PE which are used, for example, to perform the click detection (Z-direction), the photosensitive elements PE either forming part of the detectors D1 to D4 or being provided separately in addition to the detectors D1 to D4. The reference to a particular photosensitive element PE (or plural elements) means such elements of the detectors or additionally provided.

Figure 4:
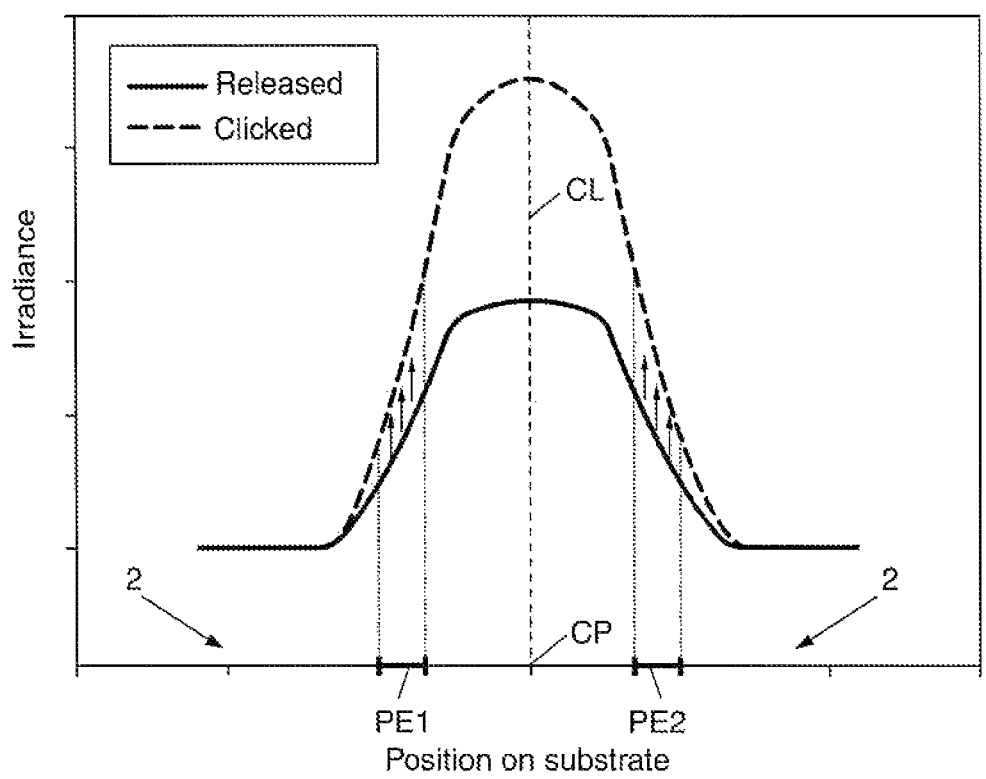
FIG. 4 shows an irradiance curve of incident light on a substrate of the detection system according to the present invention.

FIG. 4 shows a detection waveform (light intensity curve) of an irradiance on the particular photosensitive elements PE. According to FIG. 4, a basically symmetrical irradiance is provided on the at least one photosensitive element PE. In the example of FIG. 4, two photosensitive elements are considered, that is, one photosensitive element PE being positioned on the left side of the light source S and an other photosensitive element PE being positioned on the right side thereof. The corresponding output signals of the photosensitive elements PE are communicated to the click detector 16 for further evaluation.

When the knob 6 is operated by the user specifically by depressing the knob 6 downward in FIG. 1 to obtain the desired click function, upon which the distance between the light source S and the reflecting unit 8 is decreased, the irradiance on the substrate 2 increases. A corresponding situation is shown in FIG. 4. The continuous line having the smaller peak value corresponds to the irradiance on the substrate 2 (and, thus, on the photosensitive elements PE) when the knob 6 is not depressed by the user, that is, the knob 6 is released, and the dashed line having the higher peak value represents the irradiance on the substrate 2 when the knob 6 is depressed for obtaining the click function. Hence, click detection is to evaluate the difference in the irradiance between the released position of the knob 6 and the depressed position thereof. From the evaluated difference a movement instruction for moving the cursor to be controlled on the display is derived.

In FIG. 4 the curve of the irradiance on the substrate is in a preferred manner but not necessarily basically symmetric about a centerline CL which is perpendicular to the X and Y plane and which preferably contacts the X and Y plane, represented by the substrate 2 of the package 1, substantially at a center of the light source S. The position relative to the substrate 2 where the irradiance on the substrate is minimum corresponds to the borderline of the light spot 9 of the reflected light irradiated on the substrate 2. It is to be noted that the curve of the irradiance in FIG. 4 only shows a two-dimensional representation, but in fact the irradiance (light intensity distribution) has a three-dimensional arrangement on the area of the substrate 2 (see FIG. 2).

Figure 5:
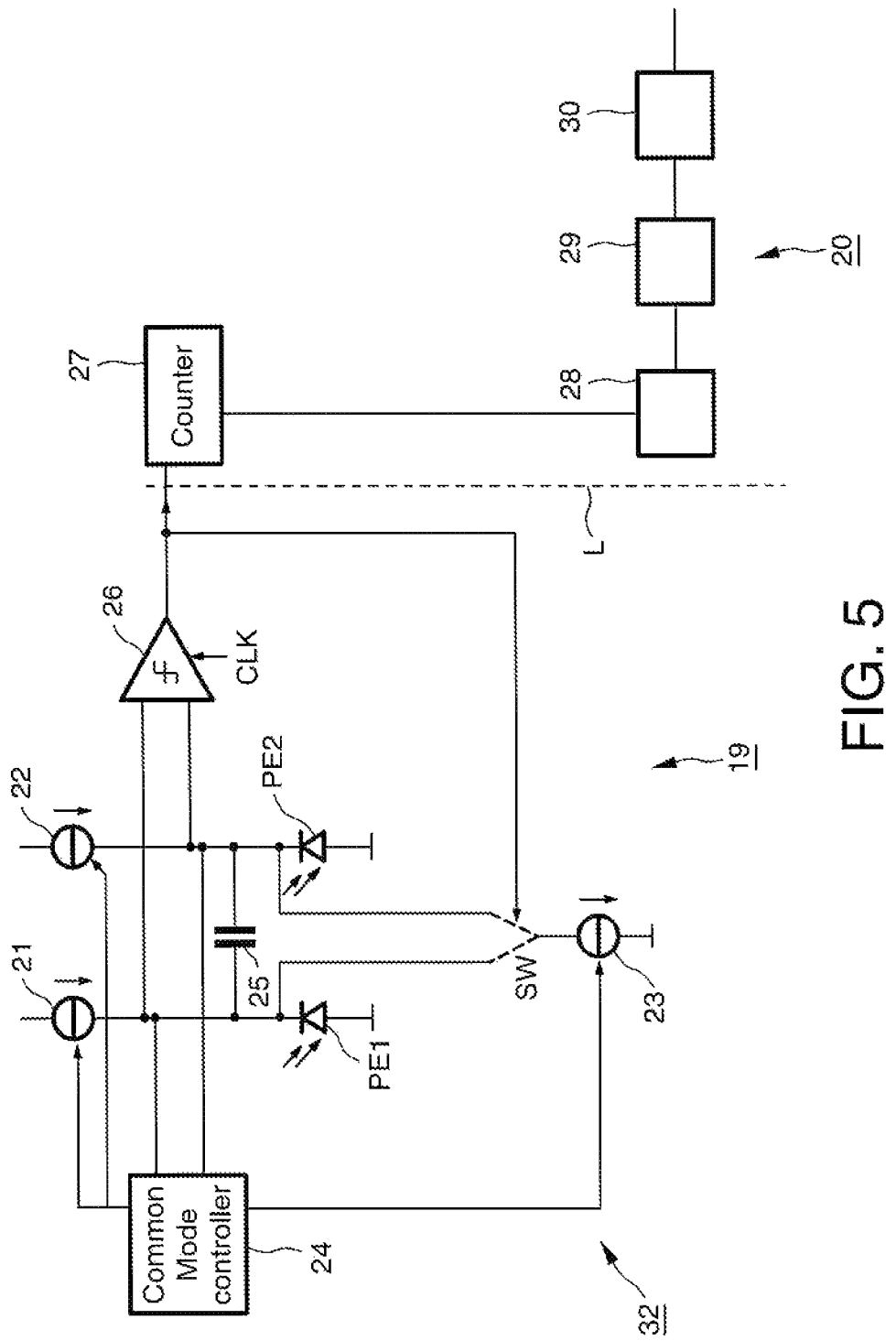
FIG. 5 shows a block circuit of the detection system representing the principles of the circuitry according to the present invention.

FIG. 5 shows a block diagram of the analogue-to-digital converter ADC and the further data path for measuring the click function (click operation of the detection system) based on the measurement of current differences according to the present embodiment.

The block circuit arrangement of FIG. 5 shows an analogue portion 19 as well as a digital portion 20. The borderline between both portions is represented by a dashed line L in FIG. 5.

The circuit arrangement of FIG. 5 includes at least one and preferably two upper current sources provided in the form of a first current source 21 and a second current source 22. A further current source represented by the third current source 23 as the bottom current source is provided and is chosen fixed to about the same current through the top current sources 21 and 22. This selected value of the bottom (third) current source 23 is a preferred value, and the present invention is not limited to this value.

The three current sources 21 to 23 are connected to a common mode controller (common mode control means) 24 adapted for providing to the ADC of the circuit arrangement of FIG. 5 a common mode control by supplying predetermined signals. The first and second current sources 21 and 22 are supplied with a horizontal common mode control signal (for detection in the X direction). Specifically, the complete circuit arrangement includes preferably two ADCs, that is, one ADC for detection in the X direction and one ADC for detection in the Y direction. To simplify representation of the circuitry only one ADC is shown in FIG. 5 and following Figures. Corresponding common mode signals for detection in the X direction and the Y direction, respectively, are supplied to the ADCs. The present invention is not limited to the arrangement of two ADCs for obtaining digital signals representing a detection in the X direction and the Y direction, and only one ADC can be used. If only one ADC is used and is multiplexed in time for usage of detecting movement in the X direction or in the Y direction then the respective common mode signals (for X direction and Y direction, respectively) need also to be multiplexed accordingly.

The third current source 23 is connected via a switch to an integration capacitance 25 and to the input of a comparator 26 provided in the form of a clocked comparator. The comparator 26 is also supplied with a voltage Vref which constitutes a reference voltage, and is further adapted for providing comparison processes in conjunction with the reference voltage Vref. Specifically, the two sides of the integration capacitor 25 are connected to the clocked comparator 26.

Furthermore, the circuitry of FIG. 5 shows two light sensitive diodes which are to represent the photosensitive elements PE. These photosensitive elements PE are assumed to be illuminated with reflected light and to generate a current according to a predetermined range (which is, for example, about 1 $\mu$A). The photosensitive elements PE are connected to the integration capacitor 25, and current is fed by the two current sources 21 and 22 which are adapted to provide a predetermined current which may be about twice the current of the photosensitive element PE. The third current source 23 may be contacted to be switched to either the right or the left photosensitive element PE.

Regarding the operation of the circuit arrangement of FIG. 5, if the left side potential (voltage) of the integration capacitor 25 is higher than that of the right side the third current source 23 is connected to the left side. This means that the voltage on the left side is falling and the voltage on the right side is rising. As soon as the voltage on the left side of the integration capacitor 25 becomes lower than that on the right side the comparator 26 detects this voltage difference on the following clock edge (the clock provided by the internal clock generator 14 of FIG. 3) and switches the third current source 23 to the right side of the integration capacitor 25. This means that the voltage on the right side starts dropping and the left side voltage starts rising. As soon as the right side voltage becomes lower than the left side voltage this is also detected by the comparator 26 on the following clock edge, and switching is performed of the third current source 23 to the left side, and the process according to the function of the detection system according to the present invention again starts from the beginning.

The output of the comparator 26 in the form of output signal OUT therefore switches between power (high level) and ground (low level). The output signals of the comparator 26 indicating the results of the comparison processes depending upon the function of the circuitry of the detection system are indicated in the clock representation of FIG. 5.

That is, when the currents on the left and the right photosensitive elements PE are equal, the number of zeros and ones are equal, and when the currents on both sides are not equal the number of ones and zeros are not equal. Hence, by simply counting the number of ones over a large number of clock cycles an accurate measurement of the current differences can be obtained. While the current detection and pre-processing is performed in the analogue section 19, the data evaluation of the results of the comparison processes of the comparator 26 are performed in the digital part, and specifically the output signals of the comparator 26 are fed to a counter 27. By means of this concept of detecting the current in the circuitry at predetermined positions, it is possible to detect an increase or decrease of the current due to an increased or decreased irradiance on the photosensitive elements PE which correspond to the click detection or any detection in the X and Y plane.

To keep the voltage over the photosensitive elements PE between ground and power supply voltage (for example voltage Vdd) the current sources, and at least the first and second current sources 21 and 22 according to a preferred embodiment may have approximately twice the current of the photosensitive elements PE. The current through the photosensitive elements PE need not to be exactly known and may even vary, since it is dependent on the amount of light coming from the light source S, being reflected by the reflecting unit 8 and being incident on the photosensitive elements PE, the quantum efficiency of the photosensitive elements PE, the ambient conditions, the stray light, and other possible influences.

In this connection, common mode control is introduced which is represented by the common mode controller 24 shown in FIG. 5. The common mode controller 24 which is adapted for influencing in a controlled manner by at least one common mode control signal the plurality of current sources 21 to 23 is further adapted to measure the medium voltage on both sides of the integration capacitor 25, and to this end, a corresponding connection between both ends (sides, terminals) of the integration capacitor 25 and the common mode controller 24 is provided. The medium voltage on both sides of the integration capacitors 25 is compared to a reference voltage Vref, and the current through all three current sources 21 to 23 is increased if the voltage is measured to be too low. In a similar manner the current through the plurality of current sources 21 to 23 is decreased, if the measured and evaluated voltage occurring at the integration capacitor 25 is too high (based on the influence of the common mode controller 24). To this end the common mode control signal is generated in a corresponding manner and the detection result is determined based on a predetermined threshold value, that is, whether the voltage is above or below this value.

Thus, the output of the common mode controller 24 is a representation of the medium current through the photosensitive elements PE. That is, the common mode controller 24 is adapted for performing a self-control, and in particular a self-regulating concept for the analogue-to-digital converter mainly established by the analogue portion 19 as is shown in FIG. 5.

More specifically in view of the click detection, during a click of the knob 6, that is, when the user intends to select a particular item on a menu on the display where the cursor has been placed (detection in the X and Y plane) and when the knob 6 is depressed for moving to a certain extent closer to the substrate 2 (see FIG. 1), the irradiance (amount of light) incident on the substrate and correspondingly on the photosensitive elements PE is increased, and as a reaction the current through the photosensitive elements PE rises significantly (see FIG. 4 indicating the irradiance profile).

That is, by detecting the differences in the control signals (that is, at least one signal) output by the common mode controller 24 and, for example, supplied to the various current sources 21 to 23, and more specifically by an evaluation of these differences over time, probably in conjunction with a predetermined threshold value, a click operation of the knob 6 (movable object) can reliably be detected.

In this connection, the detection system and in particular the analogue portion 19 thereof as shown in FIG. 5 in conjunction with the common mode controller 24 and the digital portion 20 function as a 1-bit first order sigma delta converter.

According to FIG. 5, the analogue portion 19 of the circuit arrangement of FIG. 5 corresponds to an analogue-to-digital converter ADC being on the one hand connected to the common mode controller 24 and on the other hand to the digital portion 20. More specifically, the output of the comparator 26 is connected to the counter 27 which belongs to the digital portion 20 of the circuit arrangement and which is adapted for counting the output pulses (derived from the clock signal CLK) of the comparator 26 in the form of the output signal OUT. The counter 27 is preferably provided in the form of a 10 bit counter. The counting result represents a data density modulation. (Zero=0000 . . . , Idle=1010 . . . , Fs=1111 . . . ).

The counting result may further be communicated to an offset unit 28 which can be connected to a gain unit 29. The gain unit 29 may further be connected to a threshold unit 30, and a predetermined threshold can be considered to avoid false detection due to the influence of any noise. Moreover, by counting over more periods of time the accuracy can be increased.

Figure 6:
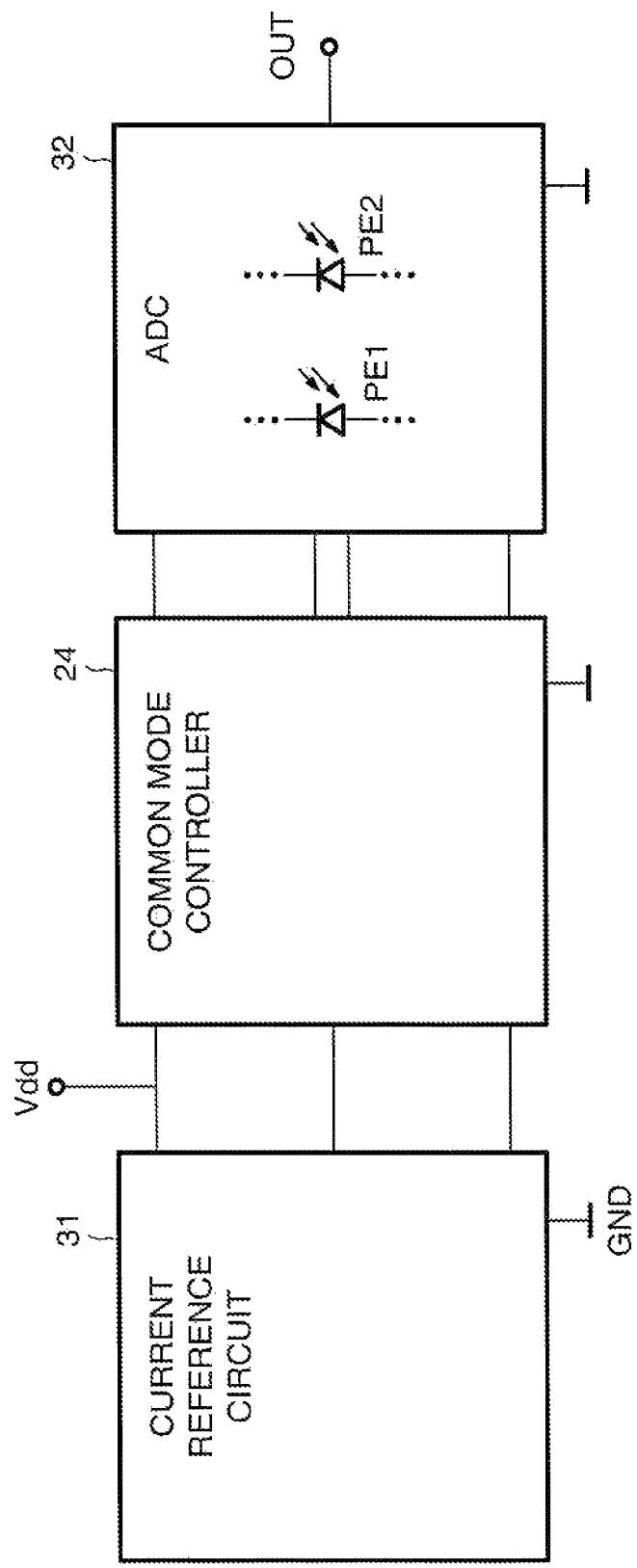
FIG. 6 shows a block circuit of the detection system depicting the main components of the circuit arrangement.
Figure 7:
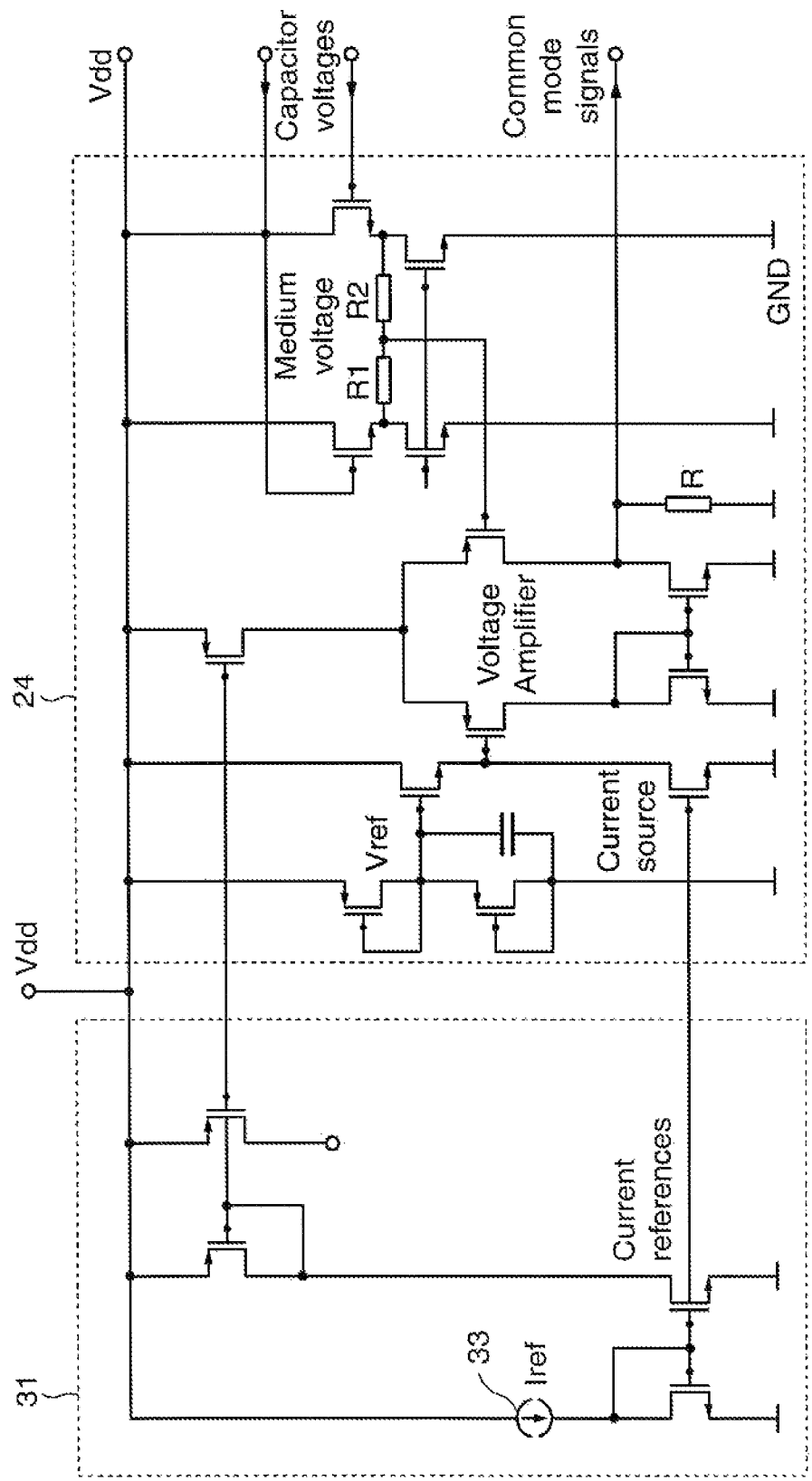
FIG. 7 shows a detailed circuit arrangement of the current reference and the common mode controller according to FIG. 6.
Figure 8:
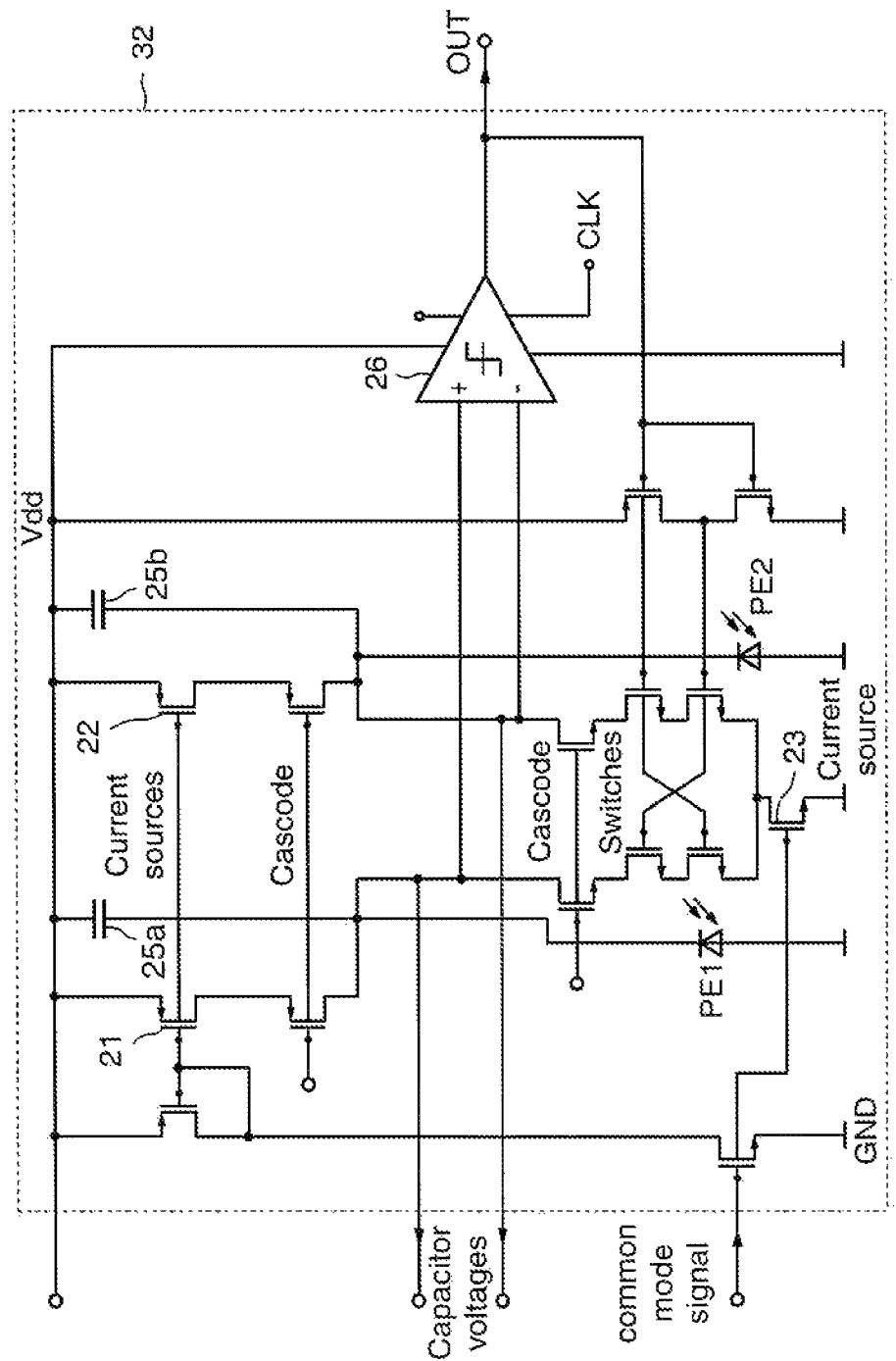
FIG. 8 shows a detailed circuit arrangement of the analogue-to-digital converter ADC according to FIG. 6.

Based on the detection and data evaluation principles shown in and described in conjunction with FIGS. 3 and 5, further FIGS. 6 to 8 show block circuit and detailed circuit arrangements according to a further embodiment of the present invention.

According to FIG. 6, in the central part of this figure the common mode controller 24 which is also shown in FIG. 5 is depicted. The common mode controller 24 having the common mode control function as already described above by generating at least one common mode control signal, is on the one hand connected to a current reference circuit 31 which provides reference currents.

On the other hand, the common mode controller 24 is connected to a circuitry 32 which represents the analogue-to-digital converter (named ADC 32 hereinafter).

The ADC 32 includes, as roughly depicted in FIG. 6, a first and a second photosensitive element PE1 and PE2 for detecting any movements in the X and Y directions (X and Y plane) and in the Z direction which is perpendicular to the X and Y plane and which corresponds to the click function. As already described above, the first and second photosensitive elements PE1 and PE2 represent the above-described detectors D1 to D4 in part or completely, or represent further photosensitive elements provided in addition to the plurality of detectors D1 to D4 and lying within the light spot which is obtained by reflecting light of the light source S by the reflecting unit 8 (fixed to the knob 6, i.e. the movable object) on the substrate 2.

The ADC 32 of FIG. 6 which output the output signal OUT may further be connected, in a similar manner as it is shown in FIG. 5, to the counter 27 and, as described above, to the offset unit 28, the gain unit 29 and the threshold unit 30.

It is now referred to FIG. 7 which shows further details, that is, further circuit components of the current reference circuit 31 and the common mode controller 24. Common to all sections is the connection to the power supply voltage Vdd and the ground potential GND.

The current reference circuit 31 includes a current source 33 for providing a reference current as a reference value for the common mode controller 24. The common mode controller 24 provides a circuitry for determining the common mode signals which are supplied to the ADC 32. In the ADC 32 as shown in FIG. 8, the common mode signals are supplied to the different current sources 21 to 23.

FIG. 8 also shows the arrangement of the first and second photosensitive element PE1 and PE2 which lie within the light spot 9 (FIG. 2) and wherein a change of current is obtained depending upon the light incident on the photosensitive elements PE1 and PE2.

In FIG. 5 the integration capacitor 25 is mentioned, and the voltage between its terminals is detected for control purposes.

This is also depicted in FIG. 8 wherein, in contrast to the arrangement shown in FIG. 5, the integration capacitor is provided in the form of two capacitors 25a and 25b. The capacitor voltages are sensed and are fed to the common mode controller 24. Furthermore, the voltages of the integration capacitors 25a and 25b are also fed to the comparator 26 which corresponds to the clocked comparator described above.

Regarding the common mode controller 24, this controller consists of a circuit portion that determines the medium voltage of the two photosensitive elements PE1 and PE2, and a voltage amplifier that controls the current sources. The voltage over the photosensitive elements PE is in a controlled manner preferably kept approximately half way between power supply voltage (Vdd) and ground potential.

The circuit that determines the medium voltage consists of two equally-matched resistances R1 and R2 in series connection so that the middle node will be at the medium voltage. The resistances R1 and R2 are connected to two matched source followers each connected to the photosensitive elements PE for sensing the voltages of the integration capacitors 25a and 25b.

The voltage amplifier has one input connected to this medium voltage. The other input is connected to a reference voltage Vref, in this case consisting of two equal transistors in series, to determine the middle of power supply voltage and ground potential, and a source follower matched to the source followers of the circuit that determines the medium voltage of the two photosensitive elements.

If the medium voltage over the photosensitive elements PE1 and PE2 becomes lower than the reference voltage, the output voltage of the amplifier rises and so increases the current running through the current sources of the ADC 32 (common mode signals). If the medium voltage becomes higher than the reference voltage the output of the amplifier lowers and therefore (by supplying corresponding common mode signals to the ADC 32) decreases the current through the current sources of the ADC 32.

The ADC 32 includes the photosensitive elements PE1 and PE2, as is shown in FIGS. 6 and 8. The photosensitive elements PE1 and PE2 therefore constitute the input terminals of the detection system according to the present invention since the irradiance on the detectors D1 to D4 (FIG. 2) and in general on the photosensitive elements PE1 and PE2 represents the sensing function, and the incident light picked-up by the photosensitive elements PE 1 and PE2 as well as of the detectors D1 to D4 is input to the circuitry of the detection system according to the present invention.

The voltage of the photosensitive elements PE1 and PE2 is approximately in the middle between the power supply voltage Vdd and the ground potential. As can be seen from FIG. 8, the photosensitive elements PE1 and PE2 are directly connected to the respective integration capacitors 25a and 25b.

The integration capacitor is, as already described, provided in the form of the two capacitors 25a and 25b, and one terminal of each of the integration capacitors 25a and 25b is connected to the power supply voltage Vdd. The other terminal is connected to the photosensitive elements PE1 and PE2, and the voltage level of the respective integration capacitors 25a and 25b are on the one hand fed to the comparator 26 and are on the other hand sensed by the common mode controller 24 (FIGS. 6 and 7). The common node of the photosensitive elements PE1 and PE2 and the integration capacitors 25a and 25b is further respectively connected to the upper, that is the, first and second current sources 21 and 22, and via switches to the third (bottom) current source 23. The transistors just above these switches have shorted source and drain. The transistors are to compensate for crosstalk of the switches just above the third current source 23. The integration capacitors 25a and 25b may be charged by the current sources, that is, by at least one thereof depending upon the operational conditions in the detection system, as well as by the current from the photosensitive elements PE1 and PE2 (at least one thereof) or the detectors D1 to D4 depending upon the conditions of incident light on these elements.

Since the capacitance of a transistor gate varies a lot around and is not efficient around 0 V, the integration capacitor is provided in the form of the two capacitors 25a and 25b. These capacitors are preferably set to twice the size of the single integration capacitor 25. Moreover, the current sources (first to third current sources 21 to 23) in the upper and lower part of the circuit arrangement shown in FIG. 8 are cascoded to obtain a suitable circuitry.

The circuit arrangement shown in FIGS. 6 to 8 can in a corresponding manner as it is the case in FIG. 5, be connected to the counter 27, the offset unit 28, the gain unit 29 and the threshold unit 30 for further data evaluation.

Since the detection system according to the present invention can be used in mobile devices it is necessary to reduce power consumption of the circuitry of the detection system. The detection system according to the present invention therefore exhibits further low power options.

It is to be expected that less than about 200 measurements per second are needed. This means that all internal analogue circuitry (the circuit arrangement shown in FIGS. 6 to 8) can be switched off in between measurements bringing the power consumption down to leakage levels.

In case, for example, the system clock is chosen 1 MHz and about 100 samples per second are needed, then the measurement time for 1024 clock cycles is only 1024 µs. With about 100 samples per second it is necessary to do one measurement approximately every 10 ms. Based on this specific condition, it is to be noted that the detection system only needs to be active about 10% of the complete operation time, and a power reduction of a factor 10 can be reached.

Furthermore, regarding the arrangement of the plurality of detectors D1 to D4 according to FIG. 2 wherein two detectors allocated to the measurement of one of the X and Y directions are used, the multiplexing of such measurement, that is, when multiplexing of the top/bottom measurement (Y direction, see FIG. 2) and of the left/right current measurement (X direction) in time, only one analogue-to-digital converter ADC is needed. Besides the reduction of power consumption also a reduction of area on the substrate 2 (FIG. 2) covered by circuitry can be reduced.

In a similar manner as the current through the plurality of current sources 21 to 23 is controlled, according to a further embodiment of the present invention, control of the current can be performed by controlling the light source S and specifically the light emitting diodes LEDs, and to influence by means of this control concept the current through the photosensitive elements PE1 and PE2 or the detectors D1 to D4, respectively. In this case, the current through the current sources can then be fixed. The control exhibits the controlled setting of the amount of light emitted by the light source S as well as the frequency or wavelength of the emitted light. It is also possible to provide a control regarding the intensity of the irradiated light by the light source S when only a portion of the light source S having probably plural light emitting elements, is supplied with a varying power.

Figure 9:
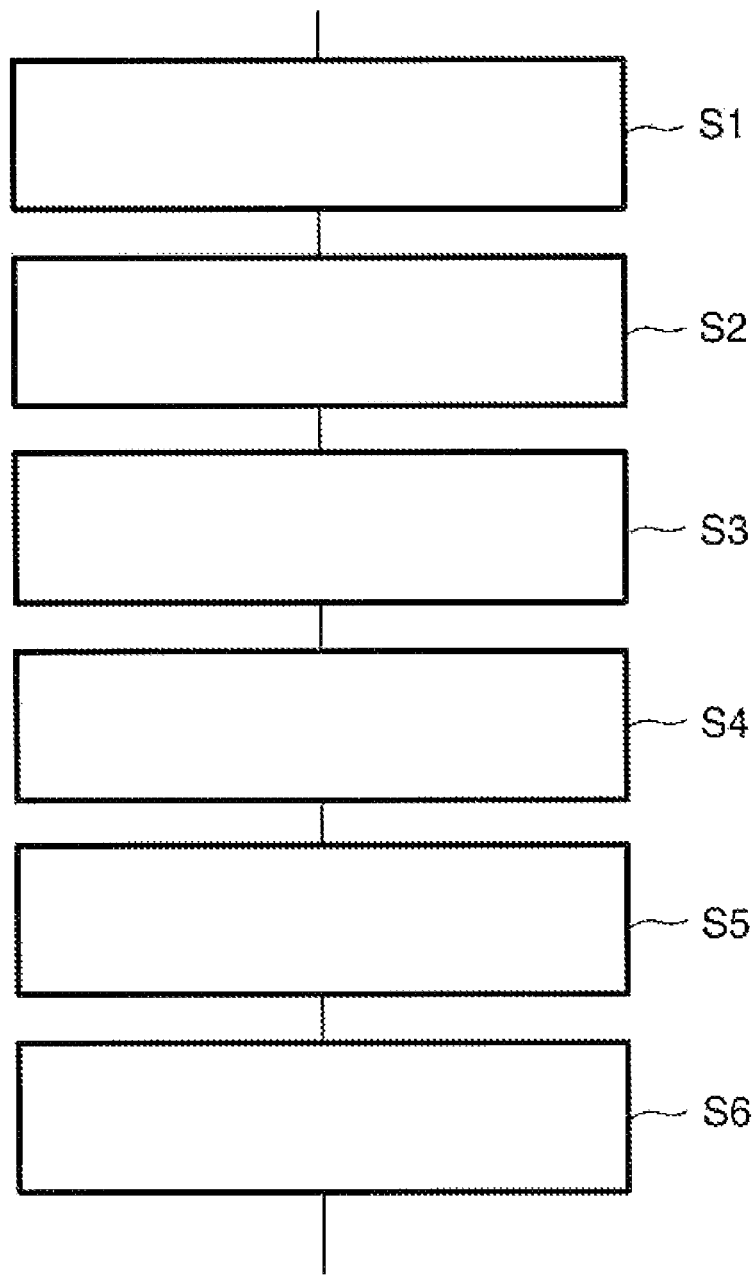
FIG. 9 shows a flow chart of particular steps of the method of detecting movements of the movable object.

FIG. 9 shows a flow chart of particular steps of the method of detecting movements of a movable object corresponding to the third aspect of the present invention.

The method of detecting movements of the movable object comprises the steps depicted in FIG. 9, wherein a first step S1 is performed for emitting light to the reflecting unit. According to a second step S2, the emitted light is reflected by the reflecting unit 8 which is arranged in a functional connection with the movable object (knob) 6, and the reflected light is in a subsequent step S3 detected by at least one detector. In this step S3 detection signals for determining the movement of the movable object are output. In a fourth step S4, by the at least one capacitor 25, 25a, 25b the detection signals and current signals output by the current sources 21 to 23 are received. A fifth step S5 refers to sensing a voltage on the at least one capacitor 25, 25a, 25b, generating at least one common mode signal and controlling the current sources with at least one common mode signal depending on the sensed voltage. In a sixth step S6 a digital signal indicative of the movement of the movable object based on the detection signal and the at least one common mode signal is output.

The method exhibits the same advantages as mentioned in conjunction with the detection system according to the first aspect of the invention.

It is further to be noted that, with reference to FIGS. 1 and 2, the digital circuit areas 11 and 12, as well as specifically the areas A1 and A2 provided for accommodating any further analog circuitry, may be covered with a metal shield to avoid problems due to light irradiated on the substrate 2 and, thus, on these digital circuit areas. Since the first and second digital circuit areas 11 and 12 and the first and second analog areas A1 and A2 according to FIG. 2 fully or partly lie within the light spot 9 created by the reflecting function of the reflecting unit 8, a shielding of the light avoids an undesired influence on the respective circuits. Alternatively or in addition thereto, the reflecting unit 8 can be given a suitable shape to avoid or to at least reduce incident light on the digital circuit areas 11 and 12 and the analog areas A1 and A2 provided for the integration of further circuitry.

The detection system and the corresponding method according to the present invention for detecting the movement of a movable object was described in conjunction with the operation of a joystick, and in particular on the basis of the movement of the knob 6 (movable object) by the user, and the detection of this movement by the detection system and in conjunction with the detection method. Besides the use of the detection system for detecting the movements of a joystick the present invention can be applied to all corresponding devices or means wherein a similar detection of any small movement of a movable object along the three spatial coordinates takes place. A reliable detection in a base plane (X and Y plane) as well as in a Z direction can be performed with high reliability and with a circuitry which can be arranged in an integrated form preferably on a common substrate (arrangement on one chip) for easy manufacturing and handling thereof.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. Any reference signs in the claims should not be construed as limiting the scope.

The invention claimed is:

1. Detection system for detecting movements of a movable object, said system comprising:
   a light source adapted for emitting light,
   a reflecting unit arranged in a functional connection with said movable object and adapted for reflecting said emitted light,
   an analogue-to-digital converter adapted for outputting a digital signal and including at least one detector for detecting said reflected light and outputting detection signals for determining a movement of said movable object, a plurality of current sources adapted for outputting current signals, and at least one capacitor adapted for receiving said detection signals and said current signals, and
   a common mode controller adapted for sensing a voltage on said at least one capacitor and for generating at least one common mode signal for controlling said current sources depending on the sensed voltage,
   wherein said digital signal indicative of said movement of said movable object is based on said output signal of said at least one detector and said at least one common mode signal.

2. Detection system according to claim 1, wherein said at least one capacitor is charged by said current sources and said at least one detector.

3. Detection system according to claim 1, wherein said at least one detector, said light source, said common mode controller and said analogue-to-digital converter are arranged on a substrate, and said reflecting unit is adapted for causing a light spot to be incident on said substrate.

4. Detection system according to claim 1, wherein said at least one common mode signal is adapted for setting the current flowing in the current sources.

5. Detection system according to claim 1, wherein said analogue-to-digital converter includes two capacitors connectable to said current sources via switches.

6. Detection system according to claim 5, wherein said analogue-to-digital converter further includes a comparator, and voltages on said two capacitors are fed to input terminals of said comparator.

7. Detection system according to claim 5, wherein said comparator is adapted for comparing voltages on said two capacitors, and outputting said digital signal as the comparison result, said digital signal being fed to said switches for controlling an open or closed state thereof.

8. Detection system according to claim 5, wherein said common mode controller is adapted for sensing a medium voltage on both capacitors and comparing the sensing result with a predetermined reference voltage.

9. Detection system according to claim 8, wherein said common mode controller generates said at least one common mode signal for increasing the current through all current sources, if the sensed medium voltage is below a predetermined threshold value, and generates said at least one common mode signal for decreasing the current through all current sources, if the sensed medium voltage is above said predetermined threshold value.

10. Detection system according to claim 6, further comprising a system clock generator for generating at least one system clock, and wherein said comparator is a clocked comparator using clock pulses of said system clock.

11. Detection system according to claim 9, wherein said common mode controller further comprises a voltage amplifier, one terminal thereof being supplied with the sensed medium voltage and another terminal being supplied with a predetermined reference voltage including said predetermined threshold value.

12. Detection system according to claim 1, further comprising a system clock generator adapted for generating at least one system clock, and said digital signal is based on clock pulses of said system clock and being fed to a counter for counting said pulses over a predetermined number of cycles, said counted number of pulses corresponding to differences in the current flowing through said detectors due to said movement of said movable object.

13. Detection system according to claim 3, wherein said light spot caused by said reflecting unit includes a predetermined irradiance profile of reflected light, and the determination of said movements of said movable object in a predetermined direction is based on an increase in the irradiance profile of said light spot on said at least one detector due to said movement.

14. Joystick for a movable device, including the detection system according to claim 1.

15. Method of detecting movements of a movable object, said method comprising the steps of:
   emitting light to a reflecting unit,
   reflecting said emitted light by said reflecting unit being arranged in a functional connection with said movable object,
   detecting said reflected light by at least one detector and outputting detection signals for determining a movement of said movable object,
   receiving by at least one capacitor said detection signals and current signals output by current sources,
   sensing a voltage on said at least one capacitor,
   generating at least one common mode signal and controlling said current sources with the at least one common mode signal depending on the sensed voltage, and
   outputting a digital signal indicative of said movement of said movable object based on said detection signal and said at least one common mode signal.

* * * * *